Patented June 1, 1937

2,082,160

UNITED STATES PATENT OFFICE 2,082,160

PSEUDOAZIMIDO COMPOUNDS AND PROCESS OF PREPARING THE SAME

Hans Henecka and Hans Andersag, Wuppertal-Elberfeld, Germany, assignors to Winthrop Chemical Company, Inc., New York, N. Y., a corporation of New York No Drawing. Application August 2, 1935, Serial No. 34,476. In Germany September 7, 1934

16 Claims. (Cl. 260—41)

This invention relates to pseudoazimido compounds and to a process of preparing the same.

In accordance with the present invention new products which are distinguished by a therapeutical activity against blood parasites are obtainable by the manufacture of pseudoazimido compounds in which two nitrogen atoms of the pseudoazimido group

are linked to two carbon atoms standing in ortho-position in a quinoline compound and the third nitrogen atom of the pseudoazimido group is linked to a quinoline radical, that is, a common quinoline or an isoquinoline radical, at least one nuclear nitrogen atom of the quinoline radicals must be in its quaternary state. Such compounds correspond, for instance, to the formula:

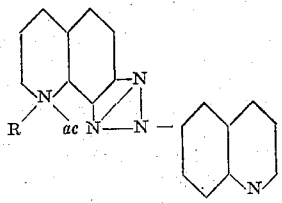

in which R stands for an alkyl or aralkyl radical, and ac stands for an acid radical. It may be mentioned that also the nitrogen atom of the other quinoline nucleus alone may be in its quaternary form, or that the nitrogen atoms of both quinoline radicals may be in their quaternary state. As groups rendering the said nitrogen atoms quaternary, those groups which are usual for this purpose may be present, particularly alkyl groups, such as the methyl, ethyl and allyl group, furthermore, substituted alkyl groups, for instance, benzyl. The acid radical of the quaternary group may be represented, for instance, by alkyl sulfate radicals, for instance, the metho- and etho-sulfate radical, by sulfonic acid radicals, for instance, the radical of the toluene sulfonic acid or by hydrohalic acid radicals, particularly the radicals of hydrochloric, hydrobromic and hydroiodic acid.

The cyclic radicals attached to the pseudoazimido group may be substituted by the customary substituents, for instance, by methyl, methoxy, ethoxy, halogen, nitro, amino and alkylamino groups.

The quaternary compounds specified above dissolve in water and to a certain extent also in hydroxyl containing organic solvents, for instance, alcohols. They are insoluble in ether, benzene, benzine and the like. When heated they decompose without showing a distinct melting point.

In accordance with the present invention the pseudoazimido compounds specified above are obtainable by reacting upon a pseudoazimido compound in which two nitrogen atoms of the pseudoazimido group are linked to two carbon atoms standing in ortho-position in a quinoline compound and the third nitrogen atom of the pseudoazimido group is linked to a quinoline radical with at least one molecular quantity of a reactive mineral acid ester of an alcohol. Such reactive mineral acid esters of alcohols are, for instance, the esters of the sulfuric acid, such as dimethylsulfate and diethylsulfate, the esters of sulfonic acids, for instance, benzene and toluene sulfonic acids, for instance methyl and ethyl ester, the esters with hydrohalic acids, for instance, methylchloride, methyliodide, allylbromide, benzylchloride and the like. The reaction is preferably carried out with heating and in the presence of a diluent, such as nitrobenzene, alcohol and the like.

It has further been found that the pseudoazimido compounds specified are also obtainable by acting upon quinoline compounds, which contain in ortho-position to an azo group an amino group and attached to the one nitrogen atom of the azo group a quinoline radical, and at least one quaternary nitrogen atom in the quinoline radicals, with an oxidizing agent, such as chromic acid, hydrogen peroxide and the like.

The invention is further illustrated by the following examples without being restricted thereto:

*Example 1.*—The quinoline-5.6-pseudoazimido-5'-quinoline of the following constitution:

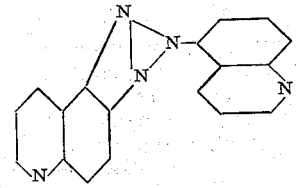

is obtained by oxidation of 6-amino-5,5'-azoquinoline in glacial acetic acid with the calculated quantity of chromic acid; the 6-amino-5,5'-azoquinoline is formed by the action of quinoline-5-diazoniumchloride in acetic acid solution upon 6-aminoquinoline.

5 grams of this compound suspended in 70 ccs. of nitrobenzene are heated with 4.5 grams of dimethylsulfate for half an hour to 80–90° C. while stirring. The bis-quaternary methyl-methosulfate which separates as an oily substance crystallizes from alcohol in almost colorless crystals which are soluble in water with a blue fluorescence and which melt at 150° C. with decomposition.

In an analogous manner the following compounds are obtained from correspondingly substituted quinoline derivatives:

Quinoline - 5,6 - pseudoazimido - 6' - quinoline, melting at 223° C. and its bis-quaternary methyl-methosulfate melting at 260° C. with decomposition;

Quinoline - 5,6 - pseudoazimido - 7' - quinoline, melting at 221° C. and its bis-quaternary methyl-methosulfate melting at 218–220° C. with decomposition;

Quinoline - 5,6 - pseudoazimido - 8' - quinoline, melting at 204° C. and its bis-quaternary chloromethylate melting at 222° C. with decomposition;

Quinoline - 5,6 - pseudoazimido-5'-isoquinoline, melting at 263° C. and its bis-quaternary methyl-methosulfate melting at 156° C.;

Quinoline - 7,8 - pseudoazimido - 7' - quinoline, melting at about 215° C. and its bis-quaternary methyl-methosulfate which decomposes on heating;

Quinaldine-5,6 - pseudoazimido - 6' - quinoline, melting at 230° C., its bis-quaternary methyl-methosulfate decomposes on heating;

8-methoxyquinoline - 5,6 - pseudoazimido - 6' - quinoline, melting (unsharp) at about 220° C., its quaternary methyl-methosulfate decomposes on heating.

*Example 2.*—The diazo solution, obtained from 11.5 grams of the hydrochloric acid salt of 6-amino-quinoline-chloromethylate in water and 40 ccs. of 5 normal hydrochloric acid and 3.5 grams of sodium nitrite, is coupled with an acetic acid solution of 7.2 grams of 6-amino-quinoline with the addition of sodium acetate. After several hours' standing the solution is acidified with concentrated hydrochloric acid and salted out with sodium chloride. The dyestuff separating forms orange red needles from aqueous alcohol which melt at 253° C.

7.7 grams of the dyestuff are oxidized in 50 ccs. of glacial acetic acid and a small quantity of water at 90° C. with 20 ccs. of a chromic acid solution containing 66.7 grams of chromium trioxide per liter. After heating for 2 hours the solution is treated with concentrated hydrochloric acid and by the addition of concentrated sodium chloride solution the hydrochloric acid salt of quinoline-5,6-pseudoazimido-6'-quinoline-chloromethylate is precipitated. Thus colorless needles are obtained which melt at 268° C.

We claim:—

1. Pseudoazimido compounds in which two nitrogen atoms of the pseudoazimido group are linked to two carbon atoms standing in ortho-position in a quinoline compound and the third nitrogen atom of the pseudoazimido group is linked to a quinoline radical, at least one of the quinoline nitrogen atoms being in its quaternary state.

2. Quinoline - 5,6 - pseudoazimido - quinoline compounds, at least one of the quinoline nitrogen atoms being in its quaternary state.

3. Quinoline -5,6- pseudoazimido -6'- quinoline compounds, at least one of the quinoline nitrogen atoms being in its quaternary state.

4. The bis-quaternary methyl-methosulfate of quinoline - 5,6 - pseudoazimido-6'-quinoline, decomposing on heating at 260° C.

5. The process which comprises reacting upon a pseudoazimido compound in which two nitrogen atoms of the pseudoazimido group are linked to two carbon atoms standing in ortho-position in a quinoline compound and the third nitrogen atom of the pseudoazimido group is linked to a quinoline radical with at least one molecular quantity of a reactive mineral acid ester of an alcohol.

6. The process which comprises reacting upon a pseudoazimido compound in which two nitrogen atoms of the pseudoazimido group are linked to two carbon atoms standing in ortho-position in a quinoline compound and the third nitrogen atom of the pseudoazimido group is linked to a quinoline radical with at least one molecular quantity of a sulfuric acid ester of an alcohol.

7. The process which comprises reacting upon a pseudoazimido compound in which two nitrogen atoms of the pseudoazimido group are linked to two carbon atoms standing in ortho-position in a quinoline compound and the third nitrogen atom of the pseudoazimido group is linked to a quinoline radical with at least one molecular quantity of dimethylsulfate.

8. The process which comprises reacting upon a pseudoazimido compound in which two nitrogen atoms of the pseudoazimido group are linked to two carbon atoms standing in ortho-position in a quinoline compound and the third nitrogen atom of the pseudoazimido group is linked to a quinoline radical with about two molecular quantities of dimethylsulfate.

9. The process which comprises reacting upon a quinoline-5,6-pseudoazimido-quinoline compound with at least one molecular quantity of a reactive mineral acid ester of an alcohol.

10. The process which comprises reacting upon a quinoline-5,6-pseudoazimido-quinoline compound with at least one molecular quantity of a sulfuric acid ester of an alcohol.

11. The process which comprises reacting upon a quinoline-5,6-pseudoazimido-quinoline compound with at least one molecular quantity of dimethylsulfate.

12. The process which comprises reacting upon a quinoline - 5,6 - pseudoazimido-quinoline compound with about 2 molecular quantities of dimethylsulfate.

13. Quinoline- 5,6 - pseudoazimido - 7' - quinoline compounds, at least one of the quinoline nitrogen atoms being in its quaternary state.

14. The bis-quaternary methyl-methosulfate of quinoline-5,6-pseudoazimido-7'-quinoline, decomposing on heating at 218–220° C.

15. Quinoline-5,6-pseudoazimido - 5' - isoquinoline compounds, at least one of the quinoline nitrogen atoms being in its quaternary state.

16. The bis-quaternary methyl-methosulfate of quinoline-5,6-pseudoazimido-5'-isoquinoline, melting at 156° C.

HANS HENECKA.
HANS ANDERSAG.